(12) United States Patent
Naamad et al.

(10) Patent No.: US 6,865,648 B1
(45) Date of Patent: Mar. 8, 2005

(54) DATA STRUCTURE FOR WRITE PENDING

(75) Inventors: Amnon Naamad, Brookline, MA (US); Yechiel Yochai, Brookline, MA (US); Sachin More, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 220 days.

(21) Appl. No.: 10/179,536

(22) Filed: Jun. 24, 2002

(51) Int. Cl.[7] .............................................. G06F 12/00
(52) U.S. Cl. ........................ 711/133; 711/100; 711/114; 711/134; 711/154
(58) Field of Search ................................. 711/100, 118, 711/114, 133, 134, 154

(56) References Cited

U.S. PATENT DOCUMENTS

| | | | | |
|---|---|---|---|---|
| 5,206,939 A | | 4/1993 | Yanai et al. | |
| 5,787,473 A | * | 7/1998 | Vishlitzky et al. | 711/134 |
| 5,893,140 A | * | 4/1999 | Vahalia et al. | 711/118 |
| 6,049,850 A | | 4/2000 | Vishlitzky et al. | |
| 6,298,386 B1 | * | 10/2001 | Vahalia et al. | 709/234 |
| 6,304,946 B1 | | 10/2001 | Mason, Jr. | |

\* cited by examiner

*Primary Examiner*—Tuan V. Thai
(74) *Attorney, Agent, or Firm*—Daly, Crowley & Mofford, LLP

(57) ABSTRACT

Destaging activities in a data storage system are controlled by providing a write pending list of elements, where each element is defined to store information related to a cache memory data element for which a write to storage is pending, and maintaining the write pending list so that destaging of a data element can be based on the maturity of the pending write.

10 Claims, 11 Drawing Sheets

DATA STRUCTURE FOR WRITE PENDING

BACKGROUND

The invention relates generally to destaging operations in data storage systems.

Mass storage systems typically employ a large number of storage devices, such as disk drives, that are accessible by one or more host processors or computers. Since reading and writing to disks is still a relatively slow operation, many data storage systems use a cache memory to speed up the transfer of information to/from the disks. In such systems, the host computers interact with the cache memory on all transfers to and from storage devices.

For example, if data is modified by a host computer, the modified data is written to cache memory, and later written back to disk (the latter operation often being referred to "destaging"). When the data storage system employs mirroring, the data to be destaged must be written to each mirror, however not necessarily at the same time.

Typically, a data structure is maintained to indicate which data elements in cache memory have been modified and therefore need to be written back to storage. Such data structures are sometimes referred to as "write pending data structures". When host computers write new or modified data into the cache memory, the data structure is marked to indicate that the data elements are "write pending" data elements. When the data elements are destaged to storage by a data storage system controller, the data structure is cleared to indicate that the data elements on the storage devices now correspond to the data elements in the cache memory.

To speed up the destaging process, many data storage systems depend on using proximity data to allow destaging to store data at approximately similar locations on a disk. For example, if data writes are performed in a sequential order, which minimizes head movement, the data storage system minimizes delays introduced by head seeks.

Therefore, many data storage systems attempt to select and sort destaging disk writes to minimize seek time. The write pending data structure for indicating write-backs is often set up to allow a device controller looking to do a write-back to a device to search for localized write-backs and it) thus increase speed. One such write pending data structure is known as a "write tree", where the data is arranged in a treelike structure which is sorted by a predetermined index system, for example, cylinder number. The device controller is able to search the write tree by cylinder numbers for proximate write-backs, and thereby minimize the head movement necessary to write data to the disk volumes. As the number of logical volumes on a disk grows, however, the technique becomes much less efficient with respect to seek minimization.

Moreover, because searching the write tree in cache memory is a time-consuming operation that requires multiple accesses to find appropriate data, that is, data that is mature enough for destaging, data storage system performance tends to suffer. Using redundant logical volumes (or mirrors) only tends to make the problem more severe, since each mirror separately searches the same write tree.

SUMMARY

In one aspect of the invention, controlling destaging activities in a data storage system includes providing a write pending list of elements, where each element is defined to store information related to a cache memory data element for which a write to storage is pending, and maintaining the write pending list to enable destaging of a data element based on the maturity of the pending write.

One or more aspects of the invention may include one or more of the following advantages. Unlike prior write tree data structures, which are geared towards finding a write pending which is physically closest to the current head location and requires multiple memory accesses, the write pending list and destaging control mechanism of the present invention instead finds the list element corresponding to the data element with the least chance of being written. This approach maximizes the write hit rate, and thus reduces the amount of destaging activity that is needed. In addition, this approach enables more educated decisions about optimal write delay.

Other features and advantages of the invention will be apparent from the following detailed description and from the claims.

DETAILED DESCRIPTION

Figure 1:
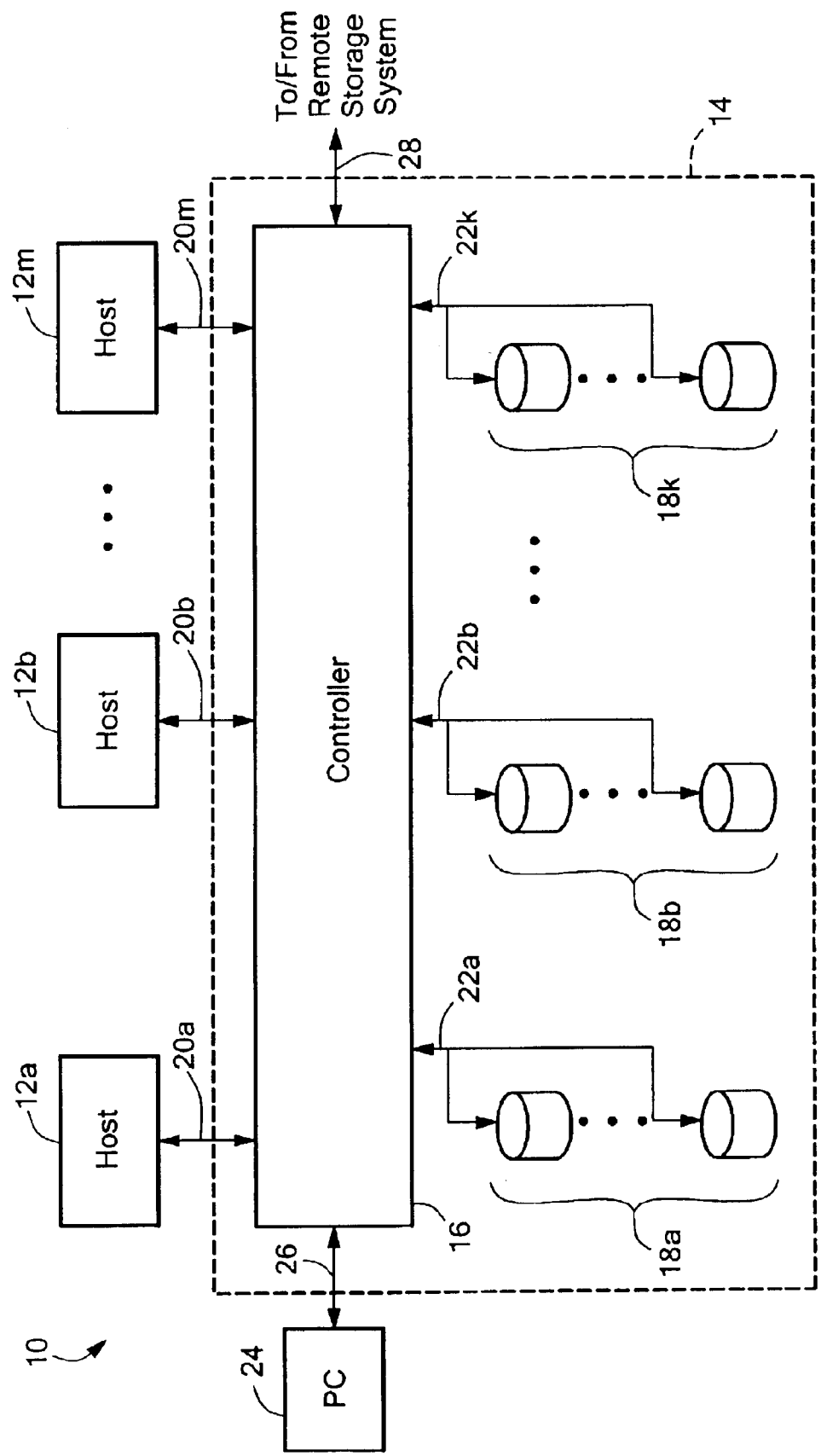
FIG. 1 is block diagram of a data processing system.

Referring to FIG. 1, a data processing system 10 includes host computers 12a, 12b, ..., 12m, connected to a data storage system 14. The data storage system 14 receives data and commands from, and delivers data and responses to, the host computers 12. The data storage system 14 is a mass storage system having a controller 16 coupled to pluralities of physical storage devices shown as disk devices 18a, disk devices 18b, ..., disk devices 18k. Each of the disk devices 18 is logically divided, in accordance with known techniques, into one or more logical volumes. The logical volumes can be mirrored on one or more other disk devices.

The controller 16 interconnects the host computers 12 and the disk devices 18. The controller 16 can be, for example, the controller of the Symmetrix data storage system from EMC Corporation. Although described herein as a component of a data storage system, the controller 16 could also be a separate appliance or server. The controller 16 thus receives memory write commands from the various host computers over buses 20a, 20b, . . . , 20m, respectively, for example, connected and operated in accordance with a SCSI protocol, and delivers the data associated with those commands to the appropriate devices 18a, 18b, . . . , 18k, over respective connecting buses 22a, 22b, . . . , 22k. Buses 22 also operate in accordance with a SCSI protocol. Other protocols, for example, Fibre Channel, could also be used for buses 20, 22. The controller 16 also receives read requests from the host computers 12 over buses 20, and delivers requested data to the host computers 12, either from a cache memory of the controller 16 or, if the data is not available in cache memory, from the disk devices 18.

In a typical configuration, the controller 16 also connects to a console PC 24 through a connecting bus 26. The console PC 24 is used for maintenance and access to the controller 16 and can be employed to set parameters of the controller 16 as is well known in the art. The controller 16 may be connected to another, remote data storage system (not shown) by a data link 28.

Figure 2:
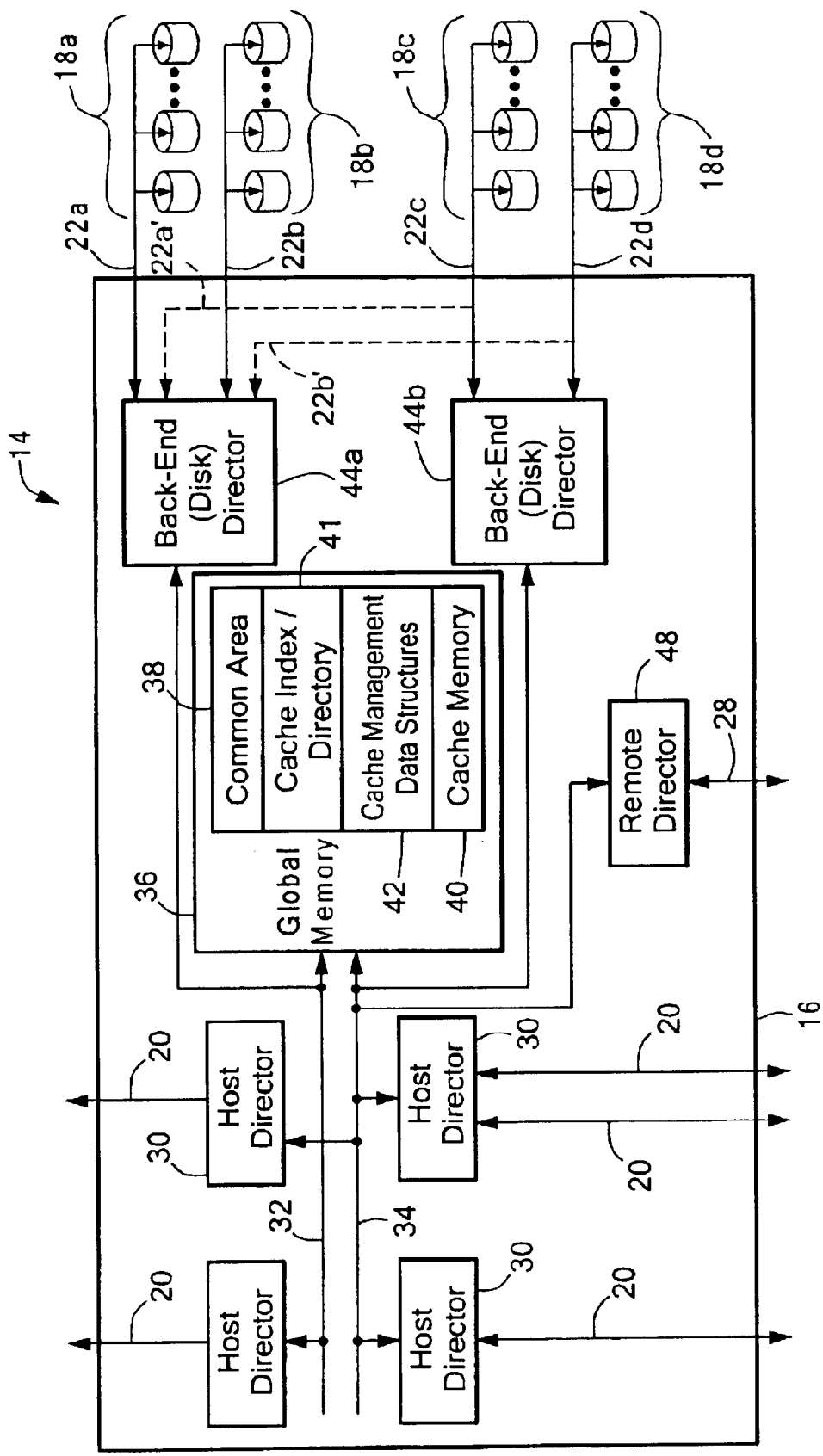
FIG. 2 is a detailed block diagram of the data processing system's data storage system and its storage controller (shown in FIG. 1).

In operation, the host computers 12a, 12b, . . . , 12m, send, as required by the applications they are running, commands to the data storage system 14 requesting data stored in the logical volumes or providing data to be written to the logical volumes. Referring to FIG. 2, and using the EMC Symmetrix data storage system controller as an illustrative example, details of the internal architecture of the data storage system 14 are shown. The communications from the host computer 12 typically connect the host computer 12 to a port of one or more host directors 30 over the SCSI bus lines 20. Each host director, in turn, connects over one or more system buses 32 or 34 to a global memory 36. The global memory 36 is preferably a large memory through which the host director 30 can communicate with the disk devices 18. The global memory 36 includes a common area 38 for supporting communications between the host computers 12 and the disk devices 18, a cache memory 40 for storing data and control data structures, a cache index/directory 41 for mapping areas of the disk devices 18 to areas in the cache memory 40, as well as various cache management data structures 42, as will be described.

Also connected to the global memory 36 are back-end (or disk) directors 44, which control the disk devices 18. In the preferred embodiment, the disk directors are installed in the controller 16 in pairs. For simplification, only two disk directors, indicated as disk directors 44a and 44b, are shown. However, it will be understood that additional disk directors may be employed by the system.

Each of the disk directors 44a, 44b supports four bus ports. The disk director 44a connects to two primary buses 22a and 22b, as well as two secondary buses 22a' and 22b'. The buses are implemented as 16-bit wide SCSI buses. As indicated earlier, other bus protocols besides the SCSI protocol may be used. The two secondary buses 22a' and 22b' are added for redundancy. Connected to the primary buses 22a, 22b, are the plurality of disk devices (e.g., disk drive units) 18a and 18b, respectively. The disk director 44b connects to two primary buses 22c and 22d. Connected to the primary buses 22c, 22d are the plurality of disk devices or disk drive units 18c and 18d. Also connected to the primary buses 22c and 22d are the secondary buses 22a' and 22b'. When the primary bus is active, its corresponding secondary bus in inactive, and vice versa. The secondary buses of the disk director 44b have been omitted from the figure for purposes of clarity.

Like the host directors 30, the disk directors 44 are also connected to the global memory 36 via one of the system buses 32, 34. During a write operation, the disk directors 44 read data stored in the global memory 36 by a host director 30 and write that data to the logical volumes for which they are responsible. During a read operation and in response to a read command, the disk directors 44 read data from a logical volume and write that data to global memory for later delivery by the host director to the requesting host computer 12.

As earlier mentioned, the data storage system 14 may be remotely coupled to another data storage system 14 via the data link 28. The remote system may be used to mirror data residing on the data storage system 14. To support such a configuration, the data storage system 14 can include a remote director 48 to connect to the data line 28 and handle transfers of data over that link. The remote director 48 communicates with the global memory 36 over one of the system buses 32, 34.

Still referring to FIG. 2, the cache memory 40 operates as a cache buffer in connection with storage and retrieval operations, in particular, caching update information provided by the host director 30 during a storage operation and information received from the storage devices 18 which may be retrieved by the host director 30 during a retrieval operation. The cache index/directory 41 is used to store metadata associated with the cached data stored in the cache memory 40.

The cache memory 40 includes a plurality of storage locations, which are organized in a series of cache slots. Typically, each cache slot includes a header and data portion that contains data that is cached in the cache slot for a data element, typically a track, with which the cache slot is associated, i.e., a track identified by the header.

The cache index/directory 41 operates as an index for the cache slots in the cache memory 40. It includes a cache index table for each of the storage devices 18a, 18b, 18k, in the data storage system 12. Each cache index table includes device header information, for example, selected identification and status information for the storage device 18 associated with the table. In addition, each cache index table includes cylinder descriptors and each cylinder descriptor includes track descriptors for each track in the cylinder. Each track descriptor includes information for the associated track of the storage device, including whether the track is associated with a cache slot, and, if so, an identification of the cache slot with which the track is associated. Preferably, each track descriptor includes a "cached" flag and a cache slot pointer. The cached flag, if set, indicates that the track associated with the track descriptor is associated with a cache slot. If the cached flag is set, the cache slot pointer points to one of the cache slots, thereby associating the track with the respective cache slot. If the cached flag is set, information from the track is cached in the cache slot identified by the cache slot pointer for retrieval by one or more of the host directors 20.

As described above, and referring back to FIGS. 1 and 2, the host director 30 typically performs storage (or write) and retrieval (or read) operations in connection with information that has been cached in the cache memory 40, and the disk directors 44 performs operations to transfer information in the storage devices 18 to the cache memory 40 for buffering ("staging") and to transfer information from the cache memory 40 to the storage devices 18 for storage ("destaging").

Generally, the host director 30, during a read operation, attempts to retrieve the information for a particular track from the cache memory 40. However, if the condition of the cached flag associated with that track indicates that the information is not in the cache memory 40 (in other words, a cache miss has occurred), it will enable the disk director 44 which controls the storage device 18 that contains the information to retrieve the information from the track which contains it and transfer the information into a cache slot in the cache memory 40. Once the disk director 44 has performed this operation, it updates the directory 41 to indicate that the information from the track resides in a cache slot in the cache memory 40, in particular, setting a corresponding cached flag and loading a pointer to the cache slot in the cache slot pointer.

After the disk director 44 has stored the data in the cache memory 40, it notifies the host director 30 that the requested data is available. At some point after receiving the notification, the host director 30 uses the tables of the directory 41 to identify the appropriate cache slot and retrieves the requested data from that cache slot.

During a write operation, the host director 30 determines if information from a track to be written is cached in a cache slot. If cached, the host director updates the cache slot with new data. If the host director 30 determines that the track is not associated with a cache slot, it selects a cache slot, stores the new data in the selected cache slot and updates the track descriptor. Once the new data is stored in the cache slot, the host director 30 notifies the disk director 44 so that the disk director 44 can write the data cached in the cache slot to the track and storage device with which the cache slot is associated as part of a destaging operation.

As discussed above, the cache index/directory 41 provides an indication of the data that are stored in the cache memory 40 and provides the addresses of the data stored in the cache memory 40. The cache index/directory 41 can be organized as a hierarchy of tables for devices (logical volumes), cylinders and tracks, as described in Yanai et al., U.S. Pat. No. 5,206,939, and Vishlitzky et al., U.S. Pat. No. 6,049,850, both of which are incorporated herein by reference.

Figure 3:
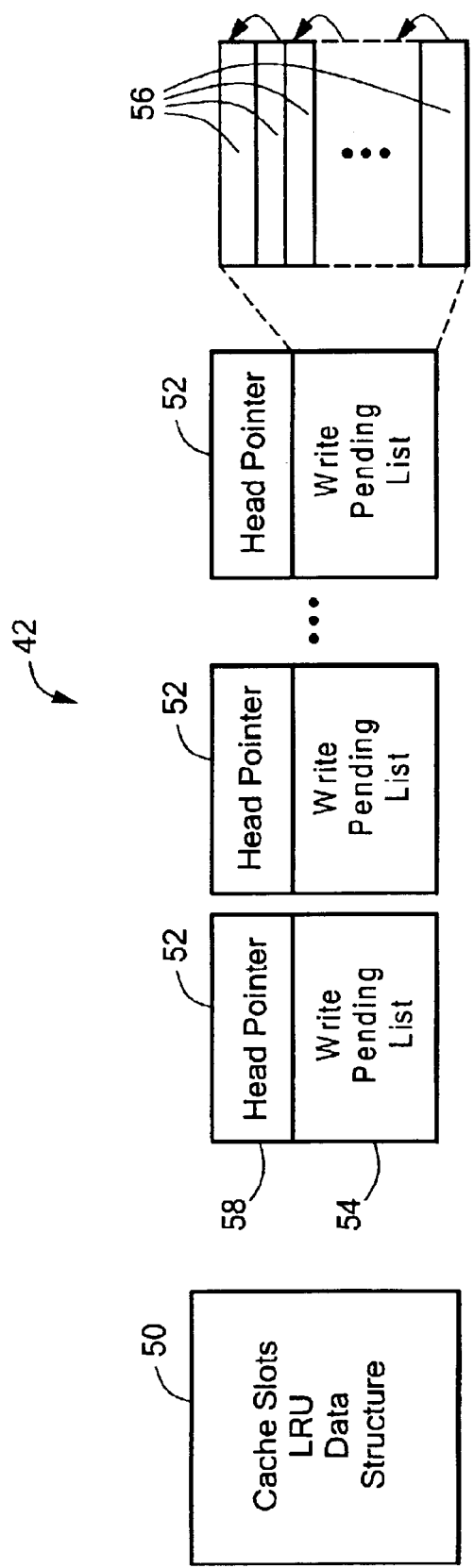
FIG. 3 is a depiction of various cache management data structures (maintained in the storage controller of FIG. 2), including a Write Pending List (WPL) of nodes corresponding to write pending cylinders for each logical volume.

Referring to FIG. 3, the data structures 42 include a cache slots Least Recently Used (LRU) data structure 50 and Global Memory Write Pending Data Structures 52. One Global Memory write pending data structure 52 is maintained for each logical volume residing on the data storage system 14.

The cache slots LRU data structure 50 includes a list of cache slots in the cache memory 40, as well as a head pointer to point to the head of the list and a tail pointer to point to the tail of the list. The cache slots LRU data structure 50 is used by the directors 30, 44 and 48 for readily identifying the least-recently-used cache slot or data element in the cache memory 40. The cache slots LRU data structure 50 can be a conventional LRU queue, or, more preferably, a "replacement queue" as described in Vishlitzky et al., U.S. Pat. No. 5,706,467, incorporated herein by reference.

Each of the Global Memory write pending data structures 52 includes a Write Pending List 54 of nodes (elements) or entries 56, and a head pointer ("HEAD") 58 associated with each WPL 54 that points to the head of or first entry of that WPL 54. The WPL 54 can be organized as a singly linked list, with each node or entry 56 pointing to the adjacent node above it on the list, as shown.

The WPL 54 is used to identify, by cylinder, cache slots that have been written to but not yet written back to a storage device, that is, those cache slots for which a write is pending and should not be overwritten with new data. For that reason, if a cache slot is represented by a cylinder on the WPL 54, then it should not be in the cache slots LRU data structure 50. The Global Memory write pending data structures 52 are accessed by the disk directors 44 for performing the destaging tasks of writing the modified data from the cache memory to the appropriate logical volumes on the storage devices 18. Thus, it is desirable to provide a separate pending Global Memory write pending data structure 52 for each of the logical volumes so that each disk director 44 need access only the data structures for the logical volumes it services.

For simplification, the WPLs 54 and the cache index/directory are shown as separate structures. However, it will be appreciated that the WPLs 54 are associated with the entries in the cylinder tables of the cache index/directory 41, and may in fact be a subset of those entries, that is, be formed by those entries in which a write pending indicator is set. In the latter case, the cylinder table entries could be adapted to include the additional fields required by the WPLS 54, as will be described with reference to FIG. 5.

Typically, when a host computer 12 writes to or updates a data element in the cache memory 40, the corresponding host director 30 updates the cache index/directory 41 as necessary to indicate a write pending in the appropriate tables and, if a write pending is not already indicated, removes the cache slot or slots containing the modified data from the LRU data structure 50 (so that they will not be overwritten before destaging can occur) as necessary.

The WPL is also updated to reflect that a write has occurred. If a write pending is not already indicated for the data element written to by the host director, then an entry or node is added to the head of the appropriate WPL 54. As will be discussed in further detail later, the WPL nodes include a timestamp that is updated to reflect a write to a data element on a cylinder already represented on the that WPL, that is, a data element for which a write back to storage is currently pending.

As indicated earlier, the WPL is a list of all cylinders with write-pending tracks belonging to the logical volume to which the WPL corresponds. As it is expensive to keep the cylinders sorted by the time they were most recently touched, the disk directors use a modified LRU technique to track such updates in the WPL. Instead of promoting a cylinder in the WPL when the data is written to one of its tracks, the responsible disk director marks the last time that the cylinder is written. When the cylinder reaches the tail of the WPL, the director checks a "Last_Written" timestamp and may promote the cylinder to the head of the WPL if it is not mature enough for destaging. Alternatively, the WPL entries 56 each can include a promotion bit that is used to indicate if the cylinder is to be promoted. The promotion bit is initially set to zero. When data is written to a track of a cylinder whose entry is somewhere in the middle of the list (i.e., not at the head or tail, where the cylinder/entry can be easily promoted), the disk director sets the promotion bit to a '1'. When that cylinder reaches the tail of the WPL, the disk director checks the promotion bit and promotes the cylinder to the head of the WPL if the promotion bit is a '1'.

Figure 4:
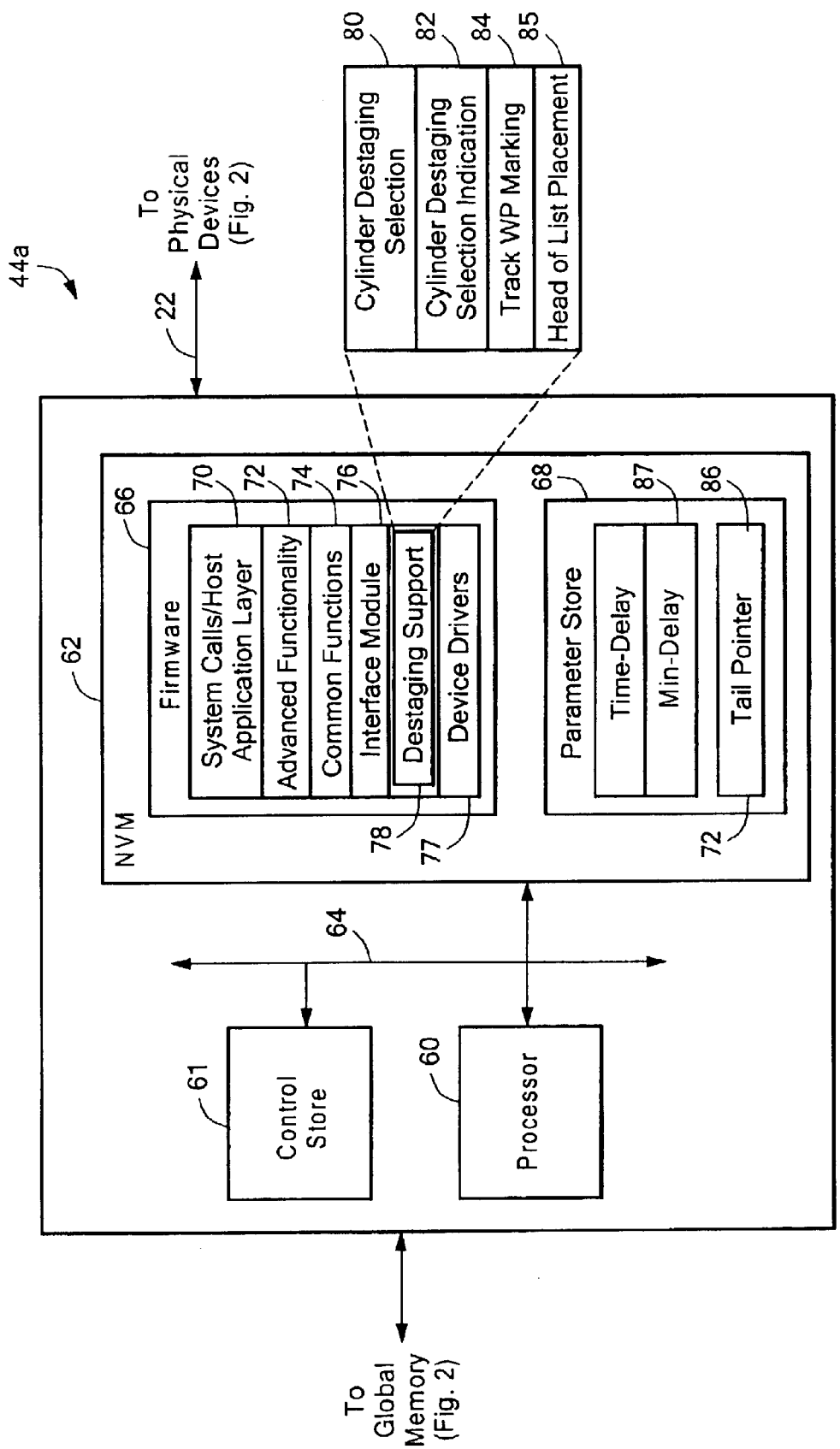
FIG. 4 is a block diagram of a director employed by the storage controller (shown in FIG. 2) to control back-end operations and configured to use the WPL in support of (and to reduce) destaging activity.

As shown in FIG. 4, the directors 30, 44 and 48 (represented in the figure by the director 44a) include a processor 60 coupled to a control store 61 and a local, nonvolatile memory (NVM) 62 by an internal bus 64. The processor 50 controls the overall operations of the director 44 and communications with the memories 61 and 62. The local memory 62 stores firmware (or microcode) 66, as well as data structures and parameter/variable data in a parameter (and data structure) store 68.

The firmware 66 and parameter store 68 are read each time the data storage system 14 is initialized. The microcode 66 is copied into the control store 61 at initialization for subsequent execution by the processor 60.

The components of the director microcode 66 include the following: a system calls/host application layer 70; advanced functionality modules 72, which may be optional at the director level or even at the data storage subsystem level; common function modules 74, which are provided to each director; an interface module 76; and one or more physical transport (or device) drivers 77. Interface modules exist for each of the different types of directors that are available based on connectivity and/or function and thus define the director functionality. Specifically, for the disk director 44, the interface module 76 is a disk interface module. That is, a director that has been loaded with the disk interface code 76 is thus programmed to serve as the disk director 44 or one of disk directors 44 (when more than one is present in the system). As such, it is responsible for controlling back-end operations of the controller 16.

The common function modules 74 includes a number of processes executed by the processor 60 to control data transfer between the host computer 12, the global memory 36 and the disk devices 18, e.g., a cache manager having routines for accessing the cache memory 40, as well as the associated cache index/directory 41 and cache slots LRU data structure 50.

The disk director interface module 76 includes code to support services for read misses, write destaging, RAID, data copy, and other background drive operations. In particular, to optimize performance for write destaging, the module 76 includes destaging support processes or routines 78. These destaging support processes 78 include a cylinder destaging selection process 80, a cylinder destaging selection indication process 82, a "mark track write-pending (WP)" process 84 and a process 85 used to place a WPL node at the head of the WPL.

The parameter store 68 includes a copy of a tail pointer ("TAIL") 86 for each WPL 54 in global memory 36 that corresponds to a logical volume serviced by the disk director 44a. Only one such tail pointer is shown in the figure. If, for any reason, the local copy of the tail pointer is lost, the disk director can recover it by reading the head of the WP list 54. Although preferably located locally in disk director memory to minimize access time and the number of accesses to global memory, the tail pointer 86 could be stored in the global memory 36. The parameter data of the parameter store 68 includes, among other information, time delay parameters Time-Delay 87 and Min-Delay 88, which are used by the processes 78 to determine a threshold level of maturity for destaging selection.

Figure 5:
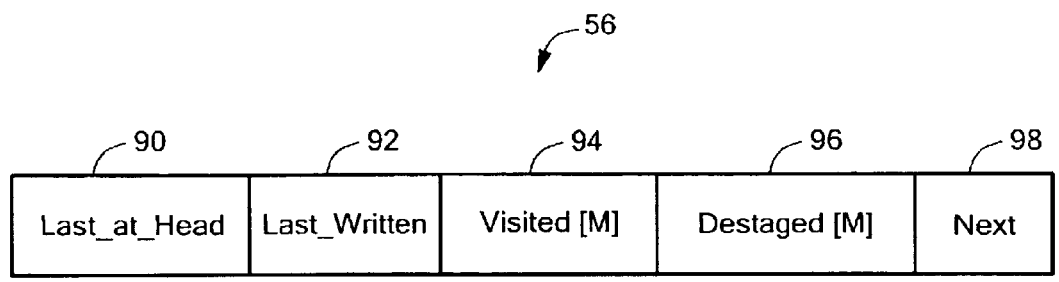
FIG. 5 is an exemplary format of an entry in the Write Pending List.

The format of each WPL entry 56 (at least those fields that pertain to pending writes and the processes 78) is shown in FIG. 5. It includes the following fields: Last_at_Head 90; Last_Written 92; Visited 94; Destaged 96; and Next 98.

The Last_at_Head field 90 specifies the last time the cylinder was at the head of the WPL 54. The Last_Written field 92 specifies the last time a track from the cylinder was written to by one of the host computers 12. The Visited field 94 is a Boolean array having one value per each mirror M. Thus, Visited[M] indicates if the cylinder has been "visited by" (that is, considered for possible destaging activity by) mirror M. If Visited[M] is TRUE, then the TAIL of mirror M points to a node above the current node. If Visited[M] is FALSE, then the TAIL of mirror M points to the current node or points to a node below the current node. The Destaged field 96 is also implemented as a Boolean array having one value per mirror. The flag setting of the Destaged [M] indicates if the cylinder has been destaged to mirror M. If Destaged[M] is TRUE, then Visited[M] is also be TRUE. The NEXT field 98 stores the pointer to the next node in the WPL.

As mentioned earlier, the time delay parameters Time-Delay 87 and Min-Delay 88 are maintained and adjusted by the microcode. The value of the parameter Time-Delay 87 is the desired amount of time (since the last write) that the write pending cylinder has to remain in the cache memory 40 before it is allowed to be destaged. The value of the parameter Min-Delay 88 is the minimal amount of time that the write pending cylinder has to remain in the cache memory 40 before it can be destaged. Preferably, the Min-Delay 88 should be about 75% of the Time-Delay 87. For example, if the Time-Delay 87 is 20 seconds, then the Min-Delay 88 is 15 seconds. All the writes to this cylinder in the first 5 seconds following the first write are not counted in the determination of whether the cylinder is mature enough for destaging. One technique for adjusting such maturity threshold parameters is described in co-pending U.S. patent application Ser. No. 09/850,551, entitled "Cache Management via Statistically Adjusted Slot Aging", filed on May 7, 2001, incorporated herein by reference.

Figure 6:
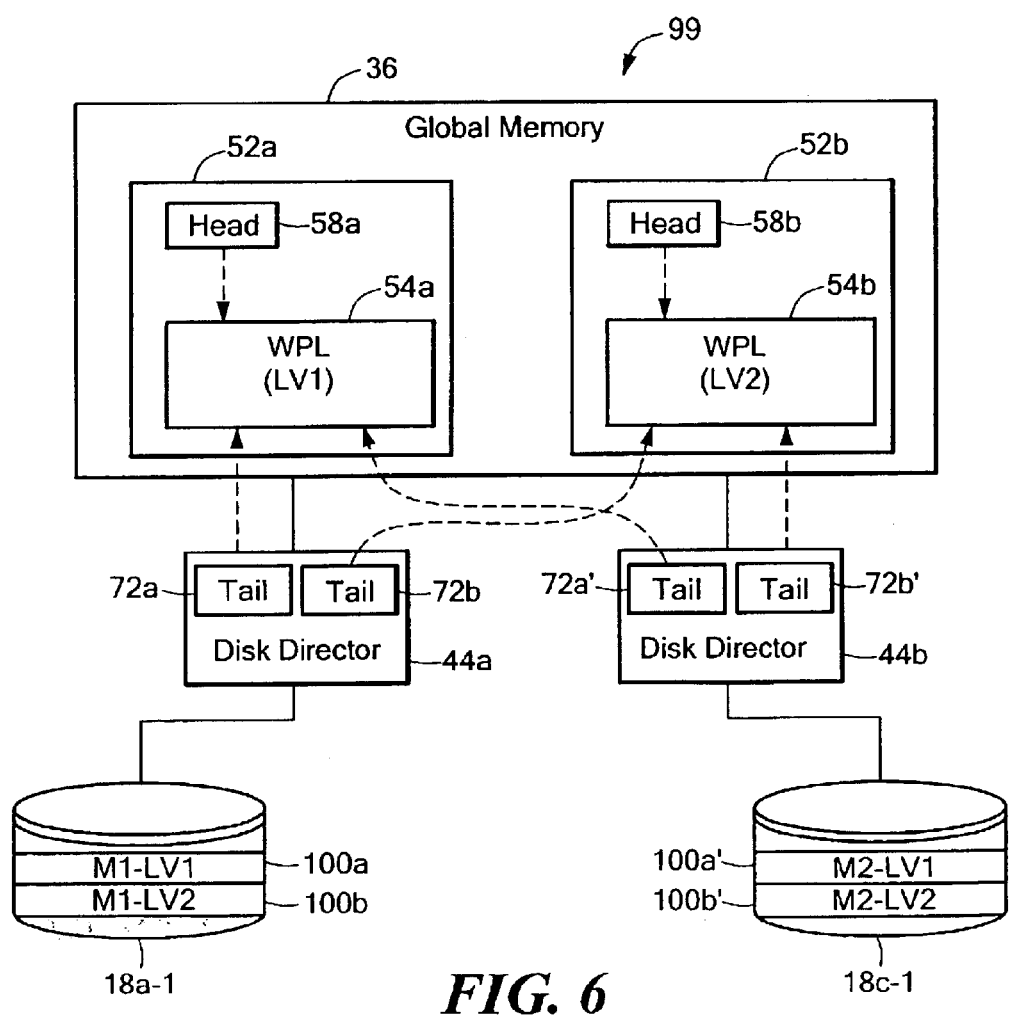
FIGS. 6 and 7 illustrate Write Pending List data structures for use in destaging write pending cylinders/tracks to logical volume mirrors.

Referring to FIG. 6, a depiction of a mirrored configuration 99 of devices and associated write pending data structures supporting the mirrored configuration is shown. In the example shown, the disk devices 18a-1 and 18c-1 each store two logical volume mirrors. The disk device 18a-1 stores a first mirror for a first logical volume LV1 (M1-LV1) 100a and a first mirror for a second logical volume LV2 (M1-LV2) 100b. The disk device 18c-1 stores a second mirror for the first logical volume (M2-LV1) 100a' and a second mirror for the second logical volume (M2-LV2) 100b'. The mirrors 100a and 100b are serviced by the disk controller 44a, while the mirrors 100a' and the mirrors 100b' are serviced by the disk controller 44b. The global memory 36 stores two Global Memory write pending data structures, one for each of the logical volumes, thus a first WPL 54a and associated head pointer 58a for LV1, and a second WPL 54b and associated head pointer 58b for LV2. Each disk director maintains a copy of a tail pointer for each WPL that corresponds to a logical volume that it service. Therefore, each disk director maintains a tail pointer to point to the tail of the WPL 54a for LV1 and a tail pointer to point to the tail of the WPL 54b for LV2. As indicated earlier, a separate tail pointer is maintained for each logical volume mirror. Thus, disk director 44b stores its own tail pointers for the write pending lists for LV1 and LV2, that is, tail pointer 72a' and tail pointer 72b', respectively. Each disk director uses its own WPL tail pointers to access the WPLs for the logical volume mirrors it supports. Thus, for example, if the disk director 44a wants to examine the WPL 54a to select a destaging candidate for M1-LV1, it uses the tail pointer 72a to locate the tail node. Upon examining the information in that node, the disk controller may do one of the following: select the node for destaging; promote the node to the head of the list and/or mark the node as having been considered ("visited") for destaging to M1; or take no action. In all but the latter case, the disk director moves the tail pointer to the next node in the list. Consequently, at any given time, the tail pointers for each of a logical volume's mirrors may point to different nodes, depending on whether the disk director for a given mirror has examined that node yet. Only when all mirrors for a logical volume have considered and selected a node for destaging activity will the node be removed from the write pending list.

Figure 7:
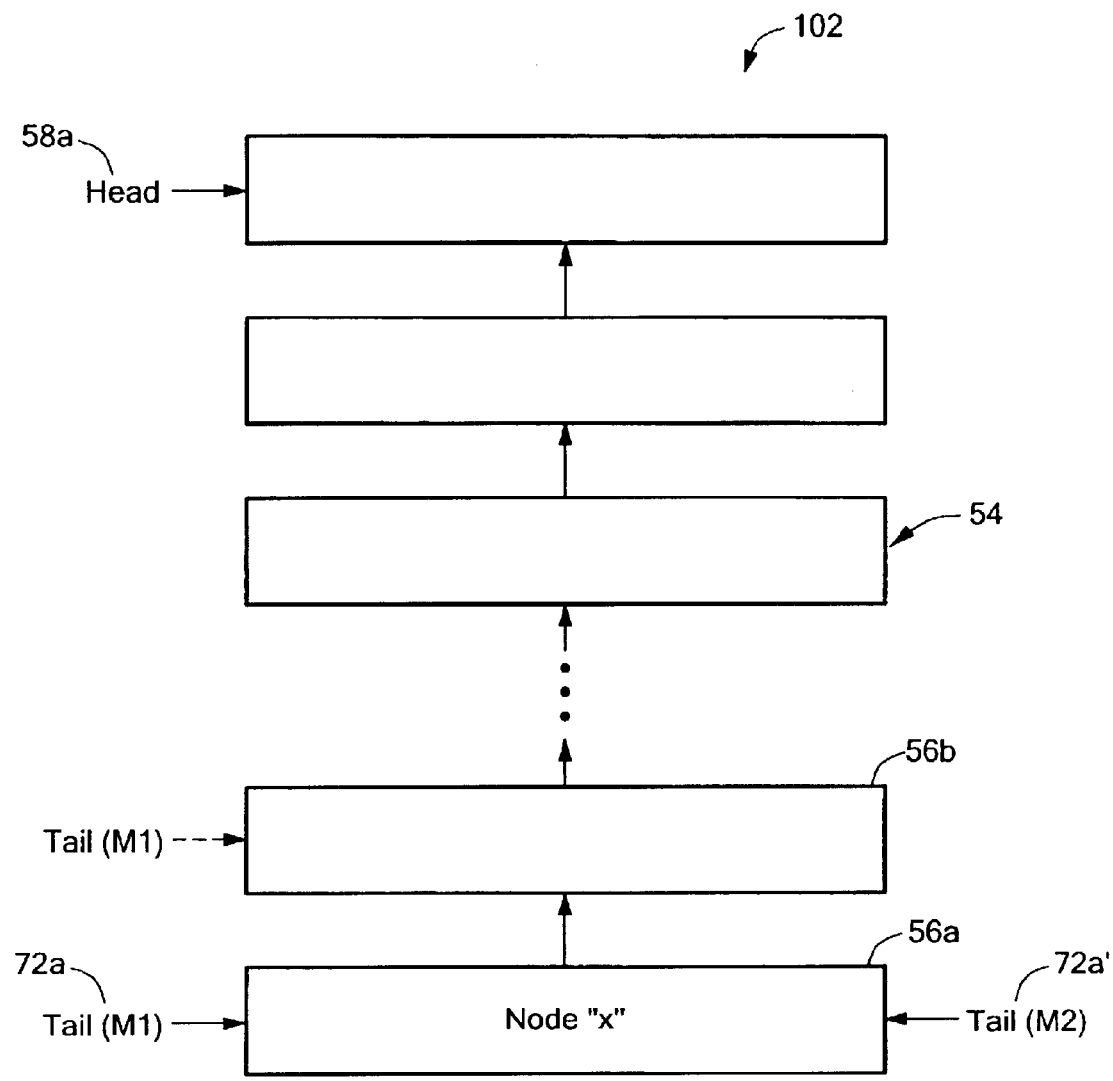

FIG. 7 illustrates an entire write pending data structure for LV1, indicated by reference number 102. The data structure 102 includes the head pointer 58a and list of nodes 54 (from Global Memory 36), as well as both tail pointers 72a and 72a'(stored in the memories of respective disk controllers 44a and 44b). In the figure, a node X 56a is the current node to be accessed by the disk controllers 44a and 44b via their respective tail pointers 72a and 72a', respectively.

The various destaging support processes 78 will now be described with reference to FIGS. 8–11, in conjunction with FIG. 7. For purposes of illustration, it will be assumed that the processes 78 will be performed by the disk director 44a for servicing LV1. Thus, disk director 44a follows the tail pointer 72a to the node X 56a.

Figure 8:
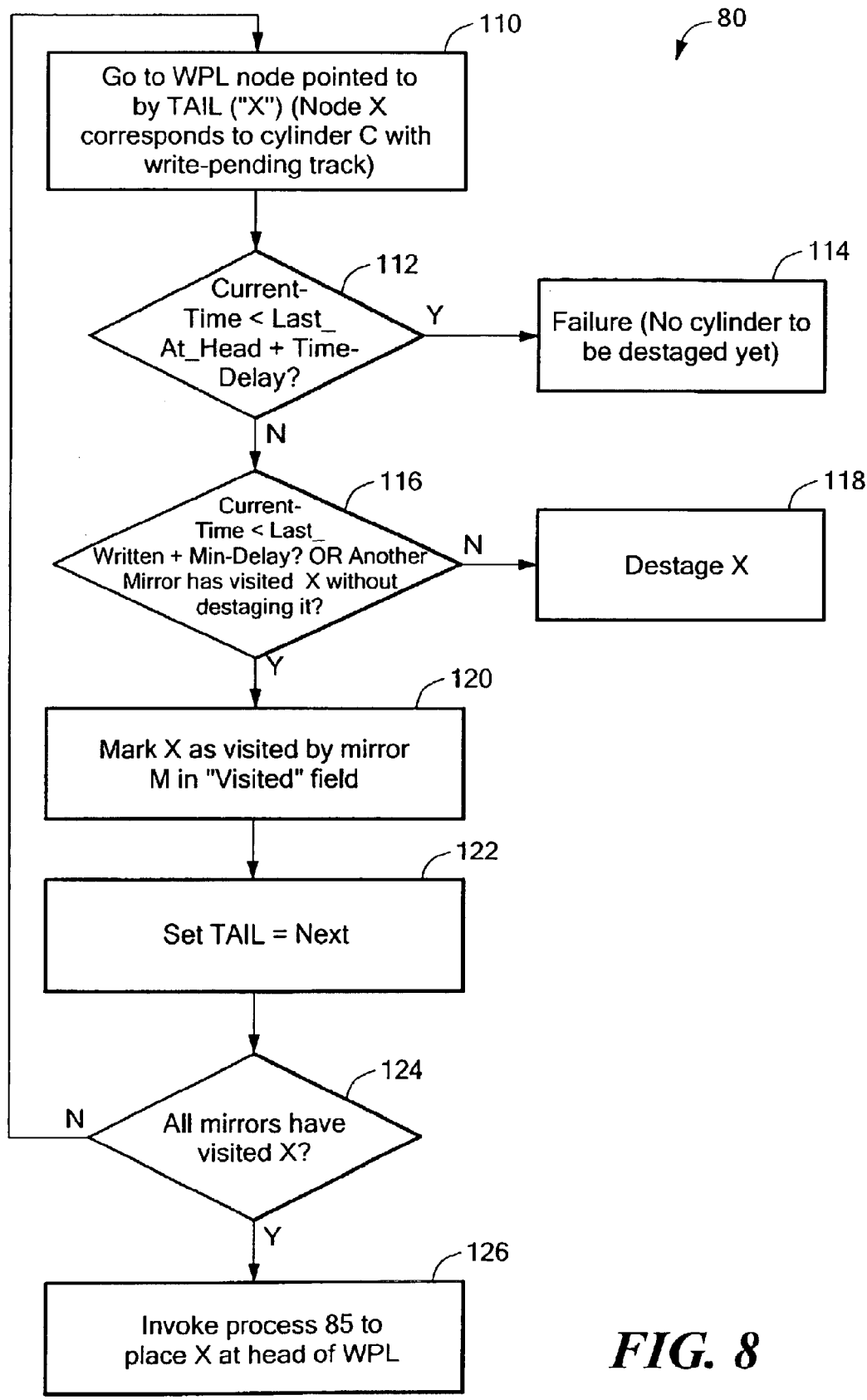
FIG. 8 is a flow diagram of a director process for using a WPL to select a write pending cylinder to be destaged to a logical volume.

Referring first to FIG. 8, an overview of the destaging selection process 80 is shown. The process 80 begins by examining the WPL node 56a pointed to by the local copy of the tail pointer, that is, TAIL 72a (step 110). The process 80 determines if a value of current (elapsed) time ("Current-Time") is less than the amount of time delay equal to the sum of the values in the fields Last_at_Head 90 (FIG. 5) and Time-Delay 87 (FIG. 4) (step 112). If so, the process 80 returns a failure indication (step 114), thereby indicating that no write pending cylinder on the WPL is mature enough to be destaged yet. Otherwise, at step 114, the process 80 determines if the Current-Time is less that the sum of the values of the Last_Written field 92 (FIG. 5) and Min-Delay 88 (FIG. 4), or determines from examining flags in the Visited array 94 and Destaged array 96 (FIG. 5) in the node or entry that another mirror has visited the node without destaging it (step 116). If both conditions are false, that is, the Last_Written value plus the Min-Delay value is greater than the Current-Time, and no other mirror has visited the node without destaging it, the process 80 returns a selection of the cylinder corresponding to the node for destaging (Step 118). Using a separate process (not shown), according to techniques well understood in the art, the disk director 44 performing the process 80 commences a destaging operation to destage one or more write pending tracks for the selected cylinder from the cache memory 40 to the logical volume.

Referring again to step 116, if at least one of the conditions is true, the cylinder corresponding to the current node will not be destaged at this time. The process 80 marks the Visited array 94 of the node to indicate that the mirror M serviced by the disk director currently executing the process 80 has visited the node (step 120) and sets the value of TAIL 72a to the value stored in NEXT 98, thus moving the tail pointer 72a to the next node in the list (that is, the node above the all current node X, e.g., node X 56a in FIG. 7) (step 122). In the illustration of FIG. 7, the new value of the TAIL for M1 is indicated by the dashed arrow pointing to the next node, node 56b. The process 80 determines if all of the mirrors for the logical volume have visited the current node X (step 124). If so, process 80 invokes process 85 to place the current node X at the head of the WPL (step 126). Otherwise, if all of the mirrors have not visited the current node X, the process 80 returns to step 110 to examine the node now pointed to by TAIL as the current node X.

Figure 9:
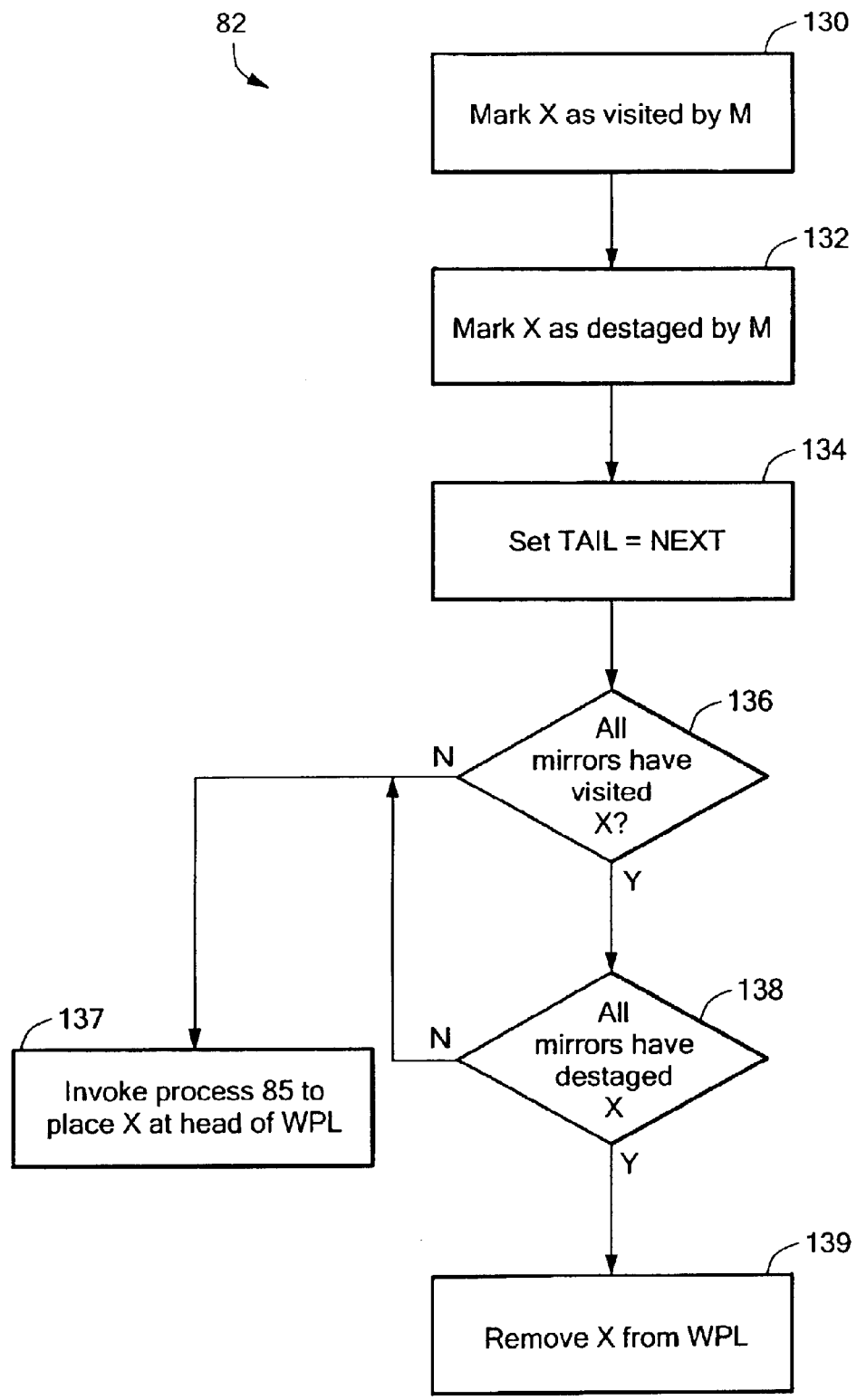
FIG. 9 is a flow diagram of a director process for adjusting the WPL to indicate a destaging selection.

Referring now to FIG. 9, the details of the cylinder destaging selection/indication routine or process 82 are shown. The process 82 marks the node X (selected for destaging by the process 80 as discussed above) as visited by the current mirror M (step 130) as well as marks the current node as destaging by the current mirror M (step 132). The process 82 sets TAIL to the value NEXT (step 134). The process 82 determines if all of the mirrors have visited the current node X (step 136). If, at step 136, it is determined that all mirrors have not visited the current node X, then the process 82 uses the process 85 to place the node X at the head of the WPL (step 137). If all mirrors have visited the node X, the process 82 determines if all mirrors have destaged node X (step 138). If all mirrors have destaged the node X, then the process 82 removes the node X from the WPL (step 139), thereby causing any associated device/ cylinder/track write pending flags in the cache index/ directory 41 to be cleared and any cache slots corresponding to the destaged cylinder track(s) to be returned to the cache slots LRU data structure 50 (the returned slots thus being made available again for access by the host computers 12).

Figure 10:
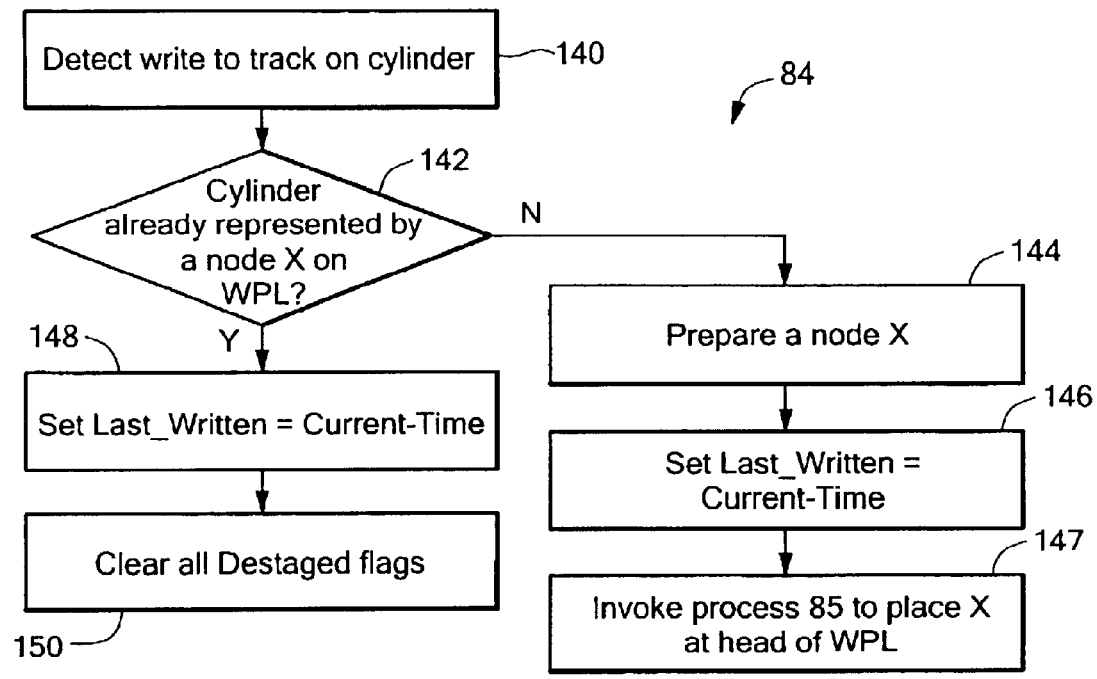
FIG. 10 is a flow diagram of a director process for updating a WPL for a logical volume to reflect a write to a track on a cylinder of the logical volume.

Referring to FIG. 10, the track pending marking process 84, that is, the process of updating the WPL when a track has been written to by one of the host computers 12, is shown. The process 84 detects a write to a track on a cylinder of a logical volume mirror serviced by the disk director performing the process 89 (step 140). The process determines if the cylinder is already represented by a node on the WPL (step 142). If it is not, the process 89 prepares a node (step 144) and sets the Last_Written field in that node to the Current-Time value (step 146) and proceeds to invoke process 85 in order to place the node at the head of the WPL (step 147). If, at step 142, the process 89 determines that the cylinder is already represented by a node on the WPL, the process 89 sets the Last_Written field to Current-Time (step 148) and clears all Destaged flags that have been set in that node (step 150).

Figure 11:
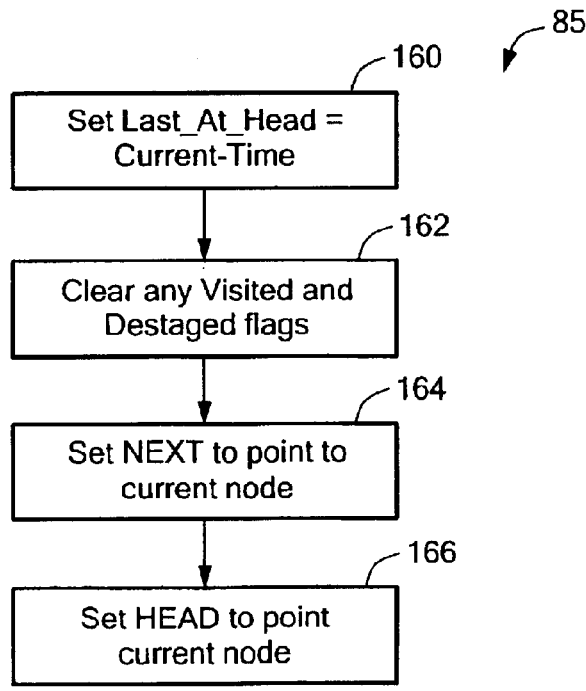
FIG. 11 is a flow diagram of a director process used to place a WPL node at the head of a WPL.

The details of the process 85 that performs the placement of a node (that is, the current node, e.g., node X from FIG. 8) at the head of the WPL are shown in FIG. 11. Referring to FIG. 11, the process 85 sets the value of Last_at_Head to the value of Current-Time (step 160). The process 85 clears any Visited and Destaged flags in the current node (step 162). The process 85 sets the value of NEXT to point to the current node (step 164) and sets the value of HEAD to point to current node (step 166).

Preferably, the destage support processing is performed as a background task. However, it may be desirable to elevate the destage support processing to a priority task for servicing pending writes when the number of pending writes exceeds a threshold number.

Figure 12:
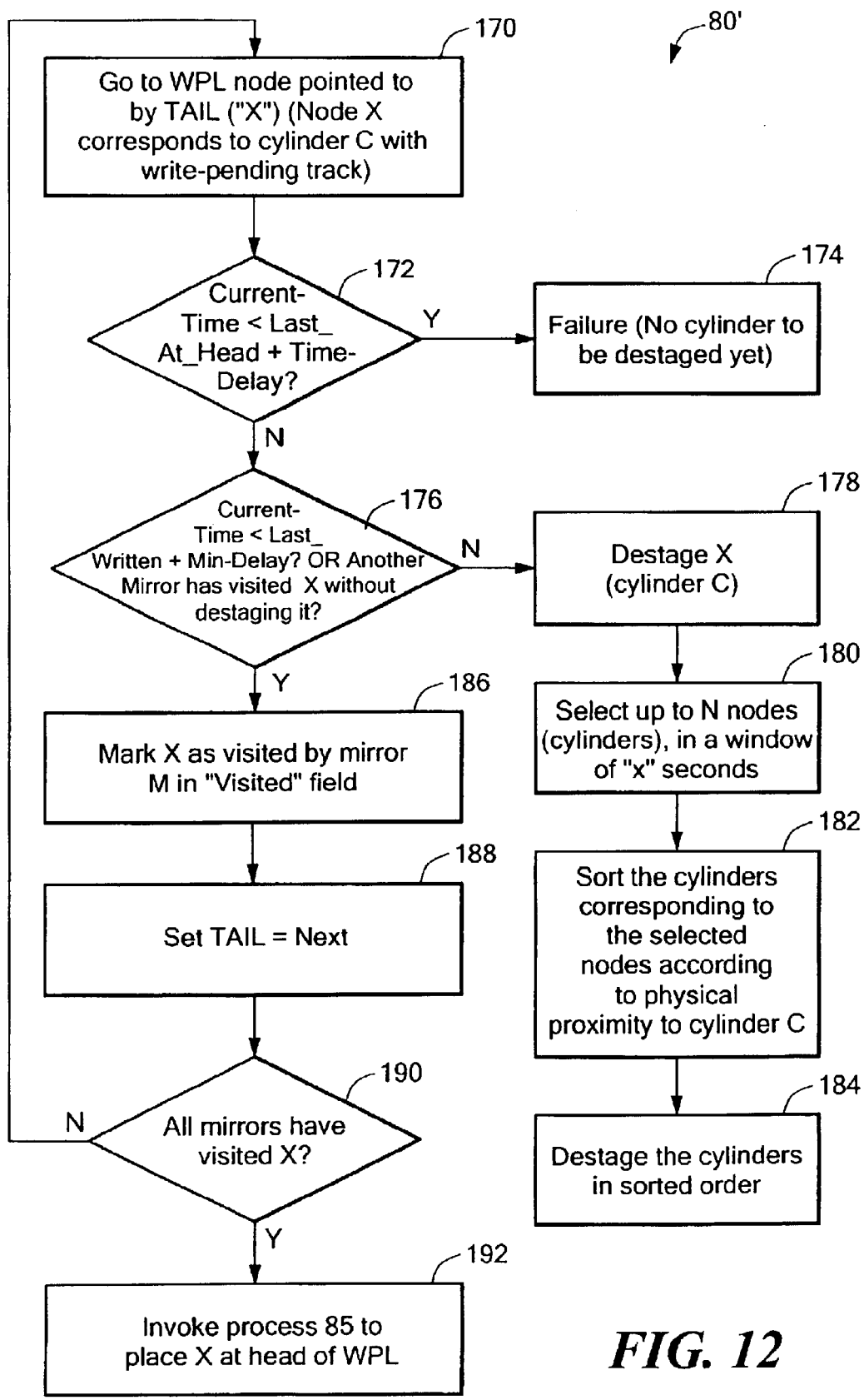
FIG. 12 is a flow diagram of a director process that uses the WPL and a sort in the selection of write pending cylinders for destaging.
Figure 13:
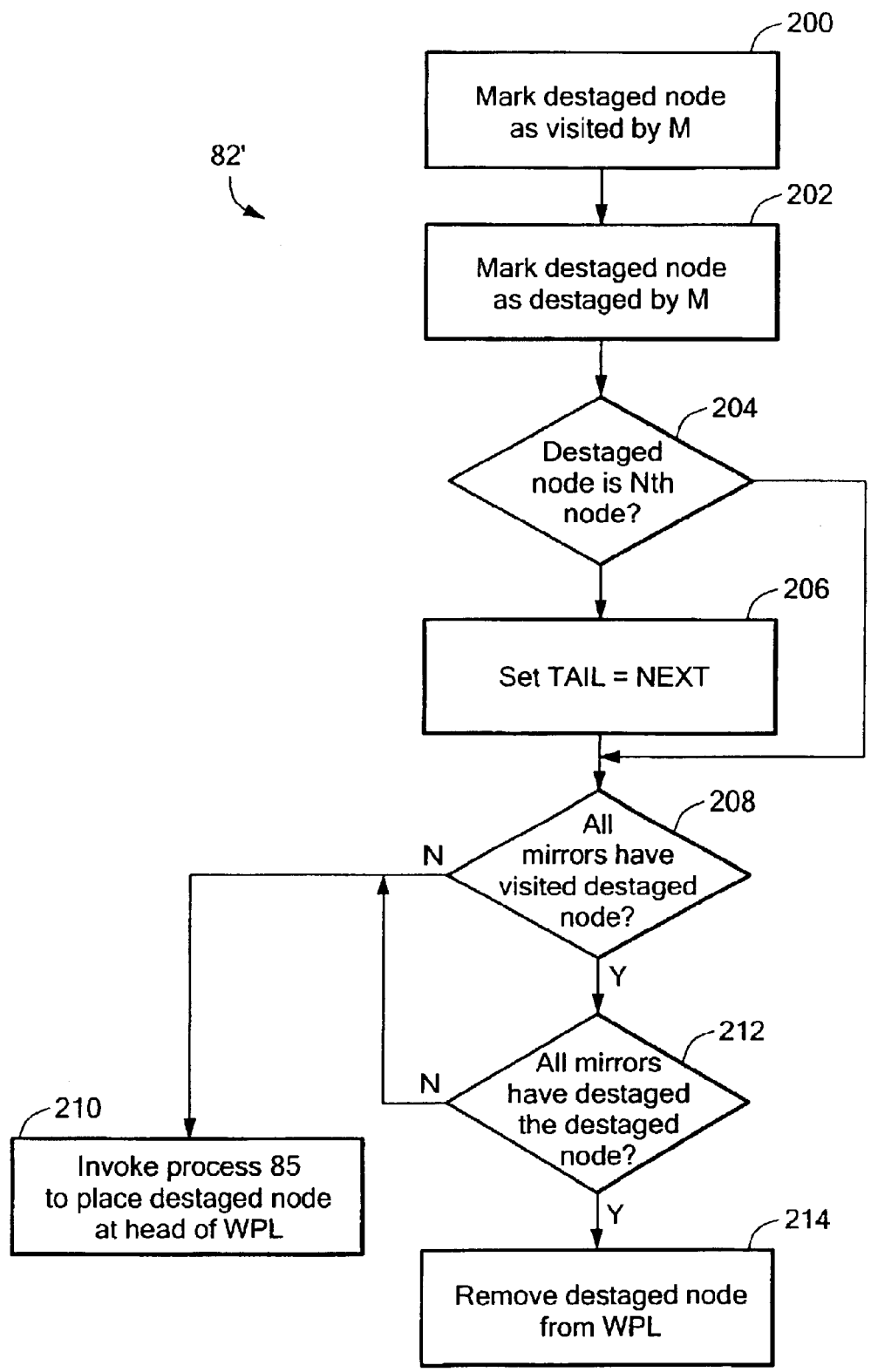
FIG. 13 is a flow diagram of a director process for adjusting the WPL to indicate the destaging selection by the process shown in FIG. 12.

In an alternative embodiment, illustrated in FIGS. 12, 13, as well as FIGS. 10–11, the destage support processing also performs a sort based on physical location within the disk to achieve benefits of prior "pyramid" data structures (examples of which are described in the above-referenced patents, as well as Mason, Jr., U.S. Pat. No. 6,304,946), in addition to the good statistics behavior of the WP list.

Referring to FIG. 12, details of an alternative destaging selection process 80, indicated as process 80', are shown. The process 80' begins by examining the WPL node pointed to by the local copy of the tail pointer, TAIL (step 170). The process 80' determines if a value of current (elapsed) time ("Current-Time") is less than the amount of time delay equal to the sum of the values in the fields Last_at_Head 90 (FIG. 5) and Time-Delay 87 (FIG. 4) (step 172). If so, the process 80' returns a failure indication (step 174) indicating that no write pending cylinder on the WPL is mature enough to be destaged yet.

Otherwise, the process 80' determines if the Current-Time is less that the sum of the values of the Last_Written field 92 (FIG. 5) and Min-Delay 8B (FIG. 4), or determines from examining flags in the Visited array 94 and Destaged array 96 (FIG. 5) in the node or entry that another mirror has visited the node without destaging it (step 176). If both conditions are false, that is, the Last_Written value plus the Min-Delay value is greater than the Current-Time, and no other mirror has visited the node without destaging it, the process 80' returns a selection of the cylinder corresponding to the node for destaging (step 17B). In addition, the process 80' selects up to N more nodes (cylinders) from the WP list within a predetermined window of time, e.g., "x" seconds (step 180, and sorts the cylinders represented by those nodes according to physical proximity to the cylinder C already selected for destaging (step 182). For example, the cylinders can be sorted by cylinder numbers (stored in the cylinder tables). The process 80' destages the N additional cylinders in the sorted order so that the I/O requests directed to those cylinders are issued in that order.

Referring again to step 176, if at least one of the conditions is true, the cylinder corresponding to the current node will not be destaged at this time. The process 80' marks the Visited array 94 of the node to indicate that the mirror M serviced by the disk director currently executing the process 80' has visited the node (step 186) and sets the value of TAIL to the value stored in NEXT 98, thus moving the tail pointer to the next node in the list (step 188). The process 80' determines if all of the mirrors for the logical volume have visited the current node X (step 190). If so, process 80' invokes process 85 (shown in FIG. 11) to place the current node X at the head of the WPL (step 192). Otherwise, if all of the mirrors have not visited the current node X, the process 80' returns to step 170 to examine the node now pointed to by TAIL as the current node X.

Referring to FIG. 13, the details of an alternative cylinder destaging selection/indication routine or process 82, indicated as process 82', are shown. The process 82' is repeated for each of the nodes/cylinders destaged by process 80'. The process 82' marks the destaged node as visited by the current mirror M (step 200) as well as marks the current node as destaging by the current mirror M (step 202). If it is determined that the destaged node currently being processed is the Nth node (step 204), the process 82' sets TAIL to the value NEXT (step 206). The process 82' determines if all of the mirrors have visited the destaged node (step 208). If, at step 208, it is determined that all mirrors have not visited the destaged node, then the process 82' uses the process 85 to place the node at the head of the WPL (step 210). If all mirrors have visited the node, the process 82' determines if all mirrors have destaged the node (step 212). If all mirrors have destaged the node, then the process 82' removes the node from the WPL (step 214), thereby causing any associated device/cylinder/track write pending flags in the cache index/directory 41 to be cleared and any cache slots corresponding to the destaged cylinder track(s) to be returned to the cache slots LRU data structure 50 (the returned slots thus being made available again for access by the host computers 12).

The process 84 and process 85 remain as described above with reference to FIG. 10 and FIG. 11, respectively.

Other embodiments are within the scope of the following claims.

What is claimed is:

1. A method of controlling destaging activities in a data storage system, comprising:
    providing a write pending list of elements, where each element is defined to store information related to a cache memory data element for which a write to storage is pending; and
    maintaining the write pending list to enable destaging of a data element based on the maturity of the pending write, wherein providing, provides a write pending list of elements for each logical volume in the data storage system, wherein maintaining comprises maintaining a head pointer to the element at the head of each write pending list and a tail pointer to point to the element at the tail of each write pending list, and wherein the information includes a first timestamp indicative of the amount of time since the element last resided at the head of the write pending list.

2. The method of claim 1, wherein each logical volume comprises logical volume mirrors and maintaining is performed by processors, each for an associated one of the logical volume mirrors, and wherein maintaining further comprises:
    comparing the current time to the sum of a time delay value added to the first timestamp in the element pointed to by the tail pointer to determine if any destaging can occur yet.

3. The method of claim 2, wherein the information further includes a second timestamp indicative of the amount of time that had elapsed when the data element was last written with data.

4. The method of claim 3, wherein maintaining further comprises:
    if it is determined that a destaging can occur, comparing the current time to a minimum time delay added to the second timestamp in the element pointed to by the tail pointer to determine if a destaging should occur with respect to the corresponding cylinder.

5. The method of claim 4, wherein maintaining further comprises:
    if it is determined that a destaging should not occur, marking the element to indicate that the element has been considered for destaging; and
    setting the tail pointer to point to a next element in the write pending list.

6. The method of claim 5, wherein maintaining further comprises:
    determining from the information that all of the logical volume mirrors for the logical volume associated with the write pending list have considered the element for destaging; and
    promoting the element to the head of the write pending list.

7. The method of claim 4, wherein maintaining further comprises:
    if it is determined that a destaging should occur, then marking that the element has been considered by the associated logical volume mirror;
    marking the element to indicate that the element is selected for destaging;
    setting the tail pointer to point to the next element in the write pending list;
    determining if all logical volume mirrors for the logical volume have considered the element for destaging;
    if it is determined that all logical volume mirrors have considered the element for destaging, determining if all the logical volume mirrors have selected the element for destaging; and if it is determine that all of the logical volume mirrors have selected the element for destaging, removing the element from the write pending list.

8. The method of claim 7, wherein maintaining further comprises:

if it is determined that all of the logical volume mirrors have not considered the element for destaging, placing the element at the head of the write pending list.

9. The method of claim 8, wherein placing the element at the head of the write pending list comprises:

setting the first timestamp to the current time;

clearing any indication that the element has been considered or selected for destaging by any of the logical volume mirrors;

setting a NEXT field in the node to point to the element; and setting the head pointer to point to the element.

10. The method of claim 8, wherein maintaining further comprises:

detecting a write involving a cylinder corresponding to one of the elements on the write pending list;

locating such element;

setting the second timestamp in the element to the current time; and clearing any indication by any one of the logical volume mirrors that the element has been selected for destaging.

* * * * *

UNITED STATES PATENT AND TRADEMARK OFFICE
CERTIFICATE OF CORRECTION

PATENT NO. : 6,865,648 B1
DATED : March 8, 2005
INVENTOR(S) : Amnon Naamad et al.

It is certified that error appears in the above-identified patent and that said Letters Patent is hereby corrected as shown below:

Column 1,
Line 44, reads "and it) thus" and should read -- and thus --.

Column 4,
Line 5, reads "bus in inactive," and should read -- bus is inactive, --.
Line 44, reads "18a, 18b, 18k," and should read -- 18a, 18b, ..., 18k, --.

Column 6,
Line 43, reads "on the that WPL," and should read -- on the WPL, --.

Column 8,
Line 13, reads "is also be TRUE." and should read -- is also TRUE. --.
Line 53, reads "that it service." and should read -- that it services. --.

Column 9,
Line 36, reads "less that the sum" and should read -- less than the sum --.
Line 59, reads "above the all current" and should read -- above the current --.

Column 11,
Line 5, reads "less that the sum" and should read -- less than the sum --.
Line 6, reads "Min-Delay 8B" and should read -- Min-Delay 88 --.
Line 14, reads "(step 17B)." and should read -- (step 178). --.

Signed and Sealed this

Twelfth Day of July, 2005

JON W. DUDAS
*Director of the United States Patent and Trademark Office*